(12) United States Patent
Battlogg

(10) Patent No.: US 6,564,664 B1
(45) Date of Patent: May 20, 2003

(54) ELECTRICALLY SUPPORTED STEERING BOOST WITH COMPACT SPUR GEAR ARRANGEMENT

(75) Inventor: Stefan Battlogg, Montafon (AT)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 09/937,370

(22) PCT Filed: Mar. 20, 2000

(86) PCT No.: PCT/CH00/00158
§ 371 (c)(1),
(2), (4) Date: Sep. 21, 2001

(87) PCT Pub. No.: WO00/59766
PCT Pub. Date: Oct. 12, 2000

(30) Foreign Application Priority Data

Mar. 30, 1999 (CH) .............................................. 0600/99

(51) Int. Cl.[7] .............................................. B62D 5/04
(52) U.S. Cl. ................ 74/388 PS; 74/421 A; 74/397; 180/444
(58) Field of Search ................ 180/444, 443; 74/388 PS, 421 A, 413, 414, 397

(56) References Cited

U.S. PATENT DOCUMENTS

| | | | | |
|---|---|---|---|---|
| 3,534,623 A | * | 10/1970 | Goodacre et al. | 74/388 R |
| 3,983,953 A | * | 10/1976 | Bayle | 180/446 |
| 4,416,345 A | * | 11/1983 | Barthelemy | 180/444 |
| 4,532,822 A | * | 8/1985 | Godlewski | 74/397 |
| 5,691,584 A | * | 11/1997 | Toida et al. | 310/67 R |

FOREIGN PATENT DOCUMENTS

| | | | | |
|---|---|---|---|---|
| DE | 10011140 A1 | * | 3/2000 | B62D/5/04 |
| EP | 0124790 A | * | 11/1984 | |
| EP | 1031491 A1 | * | 8/2000 | B62D/5/04 |
| JP | 58-141963 A | * | 8/1983 | B62D/5/04 |
| WO | WO-9812097 A | * | 3/1998 | |

* cited by examiner

Primary Examiner—Ankur Parekh
(74) Attorney, Agent, or Firm—Notaro & Michalos P.C.

(57) ABSTRACT

The invention relates to a steering boost for motor vehicles with a drive unit that is coaxially arranged in relation to the steering shaft axis and that consists of a combination of a disc-shaped electromotor and a spur gear which enables particularly high reduction ratios and a good, steering behavior which is free from play and has good compact and cost-effective construction. A rotor disc of the electromotor is rotationally arranged around the steering shaft and drives a pinion hollow shaft which is arranged coaxially in relation to the shaft. The pinion hollow shaft acts upon a spur gear that is arranged eccentrically in relation to the shaft. Power transmission from the spur gear is coupled back to the shaft. The motor and the gearbox are mounted on a carrier plate which is fixedly mounted at the vehicle chassis.

15 Claims, 2 Drawing Sheets

US 6,564,664 B1

ELECTRICALLY SUPPORTED STEERING BOOST WITH COMPACT SPUR GEAR ARRANGEMENT

FIELD AND BACKGROUND OF THE INVENTION

The invention relates to a steering boost arrangement for motor vehicles with a steering shaft with coaxially disposed electric rotor disc motor and a reducing gear acting onto the steering shaft.

EP 0 124 790 discloses a steering boost with electric drive which is coaxially installed in the steering shaft. The servo force coupling-in takes place with the aid of a servo motor which acts onto the steering shaft via a planetary gear. The gear and the motor are disposed coaxially relative to the steering shaft, with the steering shaft being guided centrally through the arrangement. Since the motor and the gear are developed as a separate assembled unit, the arrangement becomes voluminous and comprises a large number of parts, which is disadvantageous with respect to economy and reliability. A special disadvantage comprises that the sun wheel of the planetary gear is fastened on the rotor of the motor drive with the rotor and the sun wheel being rotatably disposed and supported coaxially with the shaft axis. This makes clear that in this embodiment the sun wheel always has a relatively large diameter, but at least can never have a smaller diameter than the steering shaft itself. Since the reduction ratio of a planetary gear is determined in the first step by the ratio of the diameters of the sun wheel and the planet wheels, it can readily be seen that in this embodiment large diameter ratios of the wheels cannot be attained since the sun wheel itself in this construction always has a relatively large diameter. In the description of the previously described application, a reduction ratio of 1:1 to 1:10 is specified. Larger reduction ratios would only be possible in the present embodiment if the entire gearing diameter were drastically increased, which would lead to impermissible dimensions of the steering boost arrangement.

In addition, small gear reduction ratios have the disadvantage that the motor power must be correspondingly large, and furthermore only slowly rotating motors, which require corresponding expenditures, can be employed. A further disadvantage herein is the less rapid response behavior which leads to reaction inertias in the system.

A further known embodiment comprises employing worm gearing configurations as the reduction gear. But due to the poor overall efficiency, high driving power is required, which, in turn, lead to large overall constructional forms of the servo unit and limit an economic implementation. The rotational axes offset by 90° in the worm gearing impede a compact arrangement.

Due to the voluminous construction also less structural space is available primarily in the direction of the shaft axis, which is of disadvantage primarily with respect to the safety functions. In the event of an impact of the driver onto the steering wheel, the energy must be absorbed as advantageously as possible in order for the motor vehicle driver not to be injured. This is attained thereby that in such case the steering spindle is to yield such that it absorbs the energy by telescopingly sliding one into the other. This forms the basis for the requirement of being able to provide sliding paths of maximum length for the energy absorption device, which is not readily possible with the known servo drives according to prior art. The required large installation space in the axial direction thus is at the expense of the desired energy absorption sliding path in the event of impact.

A further disadvantage in known devices comprises that, due to the complicated structuring, apart from mechanical play, also due to the large masses to be moved, these have a certain reaction inertia, which has a negative effect onto the steering behavior and the economy. The reaction inertia leads, for example, to greater response times of the steering, which, for example during rapid evasion maneuvers, is of disadvantage. Complex constructions, corresponding to the known arrangements, disadvantageously consume much energy during operation. Apart from the expenditures for the energy provision of the necessary energy, additional expenditures are necessary in order to dissipate the corresponding heat losses.

A further disadvantage of known arrangements comprises that the compensation of plays in driving parts is complicated and expensive and is only conditionally possible. This leads to less precise steering behavior and to increased reaction times, connected with a less favorably perceived steering sensation of the motor vehicle driver.

SUMMARY OF THE INVENTION

The task of the present invention lies in eliminating the disadvantages of the previously described prior art. The task lies in particular in realizing an electric steering boost for a steering arrangement which is built highly compactly and which permits attaining rapid response behavior with good dynamics with responsive steering behavior for the driver, and which operates at high efficiency and can be produced economically.

The task is solved according to the invention by the arrangement according to the features of claim 1. The dependent claims define further advantageous embodiments.

The task is solved according to the invention thereby that a disc-shaped electric motor is combined with a spur gearing with the motor being installed coaxially in the shaft of a steering spindle, a steering shaft or a steering gear pin, and the spur gearing is disposed eccentrically with respect to the shaft and coupled to it.

The rotor, which is disposed rotatably and supported about the shaft, drives a tubular fitting-shaped toothed wheel, also coaxially rotating about the shaft, which is developed as a pinion. This pinion, together with an eccentrically disposed spur wheel of greater diameter, which engages it, forms a first stage of a spur reduction gearing. This spur wheel is provided equirotatingly with a further toothed wheel, which acts onto a toothed ring of a further toothed wheel, which is connected with the steering shaft and thus transmits the motor force or acts onto the steering shaft reduced in terms of the rotational number. The sheering shaft is not interrupted and leads with its axis through the arrangement. The gear arrangement can be developed to be single-stage or multi-stage. The necessary gear reduction is defined in known manner through the ratios of the engaged numbers of teeth of the toothed wheel pairs or through its diameter ratios and through the stage number of the gear arrangement.

The stator of the rotor disc motor as well as the gear arrangement are fixed on a carrier plate, or the toothed wheels are rotationally movably supported. The carrier plate is disposed substantially transversely to the steering shaft axis and parallel to the rotor disc plane, and the carrier plate incorporates also housing parts which cover and protect the motor and the gear arrangement. The carrier plate or the housing covers disposed on it comprise fastening means, for example a fastening flange in order to hold the carrier plate with the motor stator and gear elements stationarily on the motor vehicle chassis, preferably with interspaced rubber bearings. The steering shaft itself, which is guided through the arrangement, is preferably supported bilaterially in the proximity of the entrance and exit with respect to housing parts or the carrier plate. As bearings serve for this purpose preferably friction-free rolling bearings such as ball bearings.

As the motor driving are preferably employed electronically commutating rotor disc motors, which comprise a stator winding disposed stationarily, wherein between the stator windings a rotating disc is provided as the rotor, which comprises flat permanent magnets. In order to be able to generate high moments, strong permanent magnets are preferably employed, which have magnetic energy capacity of more than 6000 Gauss, such as, for example, magnetic materials comprising rare earths, such as for example cobalt samarium material and, in particular, neodymium magnetic materials. The motor is controlled via power electronics with regulation, which measures via a torque measurement on the steering wheel side of the steering shaft the steering torque coupled-in by the motor vehicle driver and via the regulator controls the motor-gear unit such that the steering force is correspondingly augmented. The torque measurement takes place at the steering wheel side before the servo unit, for example with wire resistance strain gauges (DMS) or preferably via the deformation measurement of a torsion rod installed in the steering shaft.

The servo arrangement should be capable of outputting torques to the shaft which are >50 Nm, preferably up to 100 Nm. The driver should herein not have to apply more than maximally 10 Nm, wherein preferably no more than 6 Nm are desired in order to make possible steering with easy action. Furthermore, the torque sensor should already respond at a rotation of <1°, preferably <0.5° in order to ensure precise steering. Said torque values can be attained with the advantageous inventive combination of a rotor disc motor with the corresponding spur gearing. Through the degrees of freedom already described in the dimensioning of the motor and the gear dimensioning, the corresponding torques can be attained via the number of stages and reduction ratios per stage. Herein especially the compact construction of the arrangement are to be taken into consideration and, in addition, the arrangement should not require too much electric supply power. High motor power would increase the structural size as well as also the cooling expenditures and necessitate a greater expenditure in the control electronics. Moreover, this would require stronger light machines, greater batteries and thicker current lines. The economy would in this case no longer be given. With the arrangement according to the invention, torques of at least 50 Nm, even more than 65 Nm, can be readily achieved at maximum supply motor currents of 75 A and a voltage of 12 V. At the corresponding total optimization of the motor-gear arrangement with respect to efficiency up to 75 Nm can be attained at said motor supply. Dimensions of the motor-gear-servo arrangement are herein possible in the range of maximally 100 mm in thickness, maximally 300 mm in height and maximally 200 mm in width. With a typical embodiment example in which a two-stage gear, such as shown in the Figures, has been employed, a maximum thickness of 84 mm could be attained at a height of maximally 246 mm and a width of maximally 173 mm. The two-stage arrangement corresponding to this example is therefore an especially suitable embodiment for the present application. In this embodiment example an overall efficiency of motor and gearing of more than 80% was attained at a torque transfer of 80 Nm.

In the present embodiment overall motor-gear efficiency of better than 75% can readily be achieved. It is even possible to attain values above 85%, which is especially favorable for economic operation. In order to optimize the quietness of running and the play of the toothed wheel, it is furthermore proposed to implement the toothed wheels in engagement such that they are obliquely denticulated. Especially high level quietness of running is attained if all engaged toothed wheel pairs are implemented to be obliquely denticulated. The present structuring with the spur gearing, in addition, makes possible that means are provided which optimally permits setting the toothed wheel play. In order to obtain, as stated, good steering behavior, a servo drive with maximum freedom from play is important. But this can be in contradiction to a high gear efficiency, if the freedom from play leads to increased friction values. The setting of the toothed wheel play thus permits, on the one hand, minimizing the toothed wheel play and, on the other hand, maximizing the gear efficiency. At the values stated and with the two-stage implementation, reduction ratios of 20 to 30 have proven to be especially good for the gear arrangement.

The entire arrangement is operated upon actuation of the steering shaft via sensor elements, evaluation electronics and power electronics such that, corresponding to the actuation of the steering shaft by the driver, a force coupling onto the steering shaft takes place and thus easy-running steering is possible. The arrangement leads to an extremely compact construction which permits high efficiency and, in addition, can be well cooled at low expenditures. The required ergonomic steering behavior can be realized and, through the compact embodiment, especially with the low axial structural length, the absorption elements necessary for the event of a crash, can be optimally realized and installed.

The various features of novelty which characterize the invention are pointed out with particularity in the claims annexed to and forming a part of this disclosure and are entirely based on the Swiss priority application No. 600/99.

BRIEF DESCRIPTION OF THE DRAWINGS

In the following the invention will be explained in further detail in conjunction with schematic Figures. Therein depict.

DESCRIPTION OF THE PREFERRED EMBODIMENTS

Figure 1:
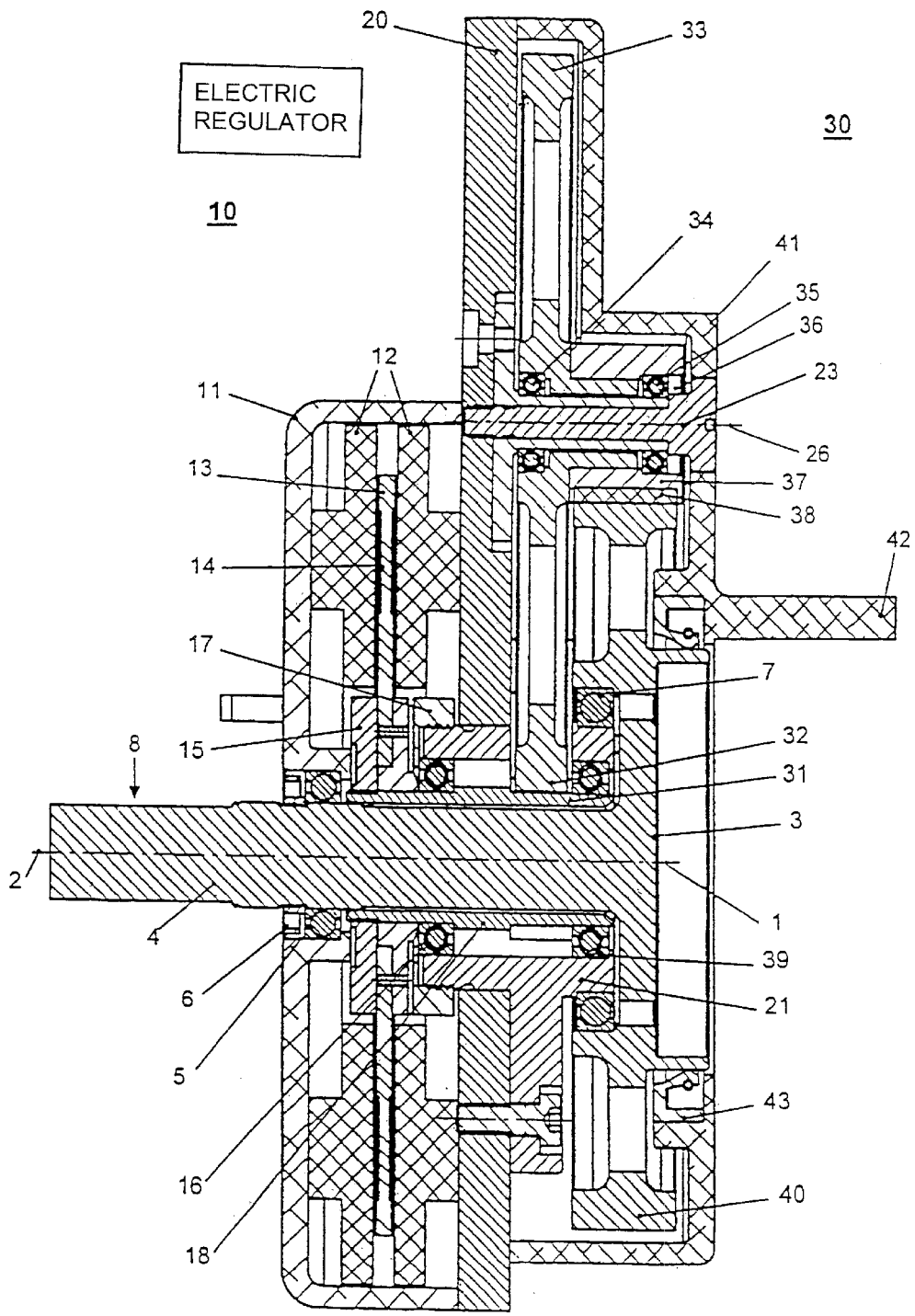
FIG. 1 schematically and in cross section a steering boost arrangement according to the invention, FIG. 2 schematically in three-dimensional representation a carrier plate, onto which the motor-gear arrangement is built, FIG. 3 a cross section of the carrier plate depicted in FIG. 2.

FIG. 1 depicts a steering boost arrangement according to the invention in cross section with a preferred two-stage spur gearing 30. A steering shaft 4, rotatable about the steering shaft axis 1, penetrates through the steering boost arrangement 10, 30 and is supported with respect to it with rolling bearings, preferably ball bearings 5, 7. On the left side of the Figure the steering wheel side 2 is depicted and on the right side, the gearing wheel side 3 of the shaft 4. A motor 10 is advantageously positioned on the steering wheel side 2, whereas gearing 30 is provided on the wheel side 3 of the shaft. In the proximity of steering wheel side 2 means 8 are also provided for the acquiring of the torque which during the steering process is output by the driver to the steering shaft 4. This torque measuring means 8 generates a corresponding signal which is output to regulation electronics for further processing in order to control the motor 10 correspondingly. To measure the torque, wire resistance strain gauges can, for example, be employed. An especially suitable acquisition of the torque takes place by installing a torsion rod in shaft 4 with the measurement of the torsion correspondingly associated with the torque. The rotor disc electromotor 10 is developed as an electronically commutating motor, which is disposed coaxially about the steering shaft 4. The rotor disc 13 rotates coaxially about shaft 4 and is driven by the stator windings 12 disposed symmetrically and on both sides of the rotor disc 13. Rotor disc 13 comprises, for example, a fiber-reinforced synthetic material and includes mill-outs which receive the permanent magnets 14. The mill-outs for the permanent magnets 14 can be carried out on alternate sides in the rotor disc 13 and in this case are not passing through, wherewith a simple fixing and positioning of the magnets is ensured. Using synthetic materials has the advantage that the disc 13 becomes very light and can be produced cost-effectively. Especially easy of production is disc 13 if it is implemented as an injection molded part. In the case of especially high requirements of low axial wobble of rotor disc 13, the latter is preferably produced of metal, in particular of stainless steel (INOX), with maximum low magnetizability. Motor 10 as well as also the gearing 30 is defined and fixed relative to a stationary carrier plate 20. The carrier plate 20 comprises a penetration opening for shaft 4 and is disposed in a parallel plane to the rotating rotor disc 13, thus transversely to shaft 4. At the motor side, the carrier plate 20 receives, for example, a motor housing cover 11, which covers the motor configuration and protects it and is simultaneously developed as a carrier for a steering shaft bearing 5, which is fixed via a securement 6. The penetration opening 22 in the carrier plate 20 is developed for example in the form of a tubular fitting and assumes the function of a bearing holding block 21 for receiving the pinion tube piece hollow shaft bearing 39, 16. The pinion hollow shaft piece 31 is developed as a short tube piece and is supported coaxially with respect to shaft 4 opposite the carrier plate 20 or the bearing holding block 21 with the bearings 39, 16 rotatably about the steering shaft axis 1. At one end of the pinion hollow shaft piece 31 is fastened the rotor disc 13 via the rotor fastening 15 such that the rotor disc 13 transmits the torque of motor 10 to the pinion 31. The other end of the pinion 31 is developed as toothed wheel pinion and meshes with a first spur wheel 33, which has a greater diameter relative to the pinion corresponding to the desired reduction ratio. The spur wheel 33 is rotatably supported with bearings 34, 35 on a spur wheel axle 23 fixed on the carrier plate 20. The bearings are secured for example in known manner, with securements 36, 6, 17. A further toothed wheel 37, which, relative to the first spur wheel 33, has a smaller diameter, is developed as a pinion 37 and directly connected with the first spur wheel 33 and rotates about the same axis. This second pinion 37 via the toothing engagement 38 meshes with a second spur wheel 40 which, relative to the pinion, has a greater diameter and is directly connected with shaft 4. In order to be able to attain favorable dimensions of the arrangement at the required torques and low electric supply power of motor 10, the toothed wheel diameters are dimensioned such that the overall reduction of the two-stage spur gearing is in the range of 20 to 30. It is herein favorable if the two stages have approximately equal reductions, for example approximately each the fivefold, which means overall the 25-fold. For example with this embodiment at a 12 V supply voltage and 75 A supply current, a torque of 65 Nm and, at 100 A, a torque of 80 Nm was transferred to shaft 4. An especially quiet and precise run is ensured if the denticulation of the gearing is oblique. In order for pinion 31 of the first stage 31, 33 to be able to mesh into the first spur wheel 33 supported eccentrically with respect to the shaft axis 1, in the tubular fitting-shaped bearing holding block 21 at the side at which the first spur wheel 33 must penetrate, a lateral slot-form penetration opening 22 for the toothed wheel 33 is provided. Gearing 30 is covered advantageously by a gear housing cover 41, and thus is protected, and this cover is fixed on the carrier plate 20 and simultaneously incorporates a fastening flange 42 for mounting on the motor vehicle chassis. On the wheel side 3 of shaft 4 in the proximity of the second spur wheel 40 disposed here, advantageously a shaft seal 43 is provided in order to avoid penetration of dirt.

Figure 3:
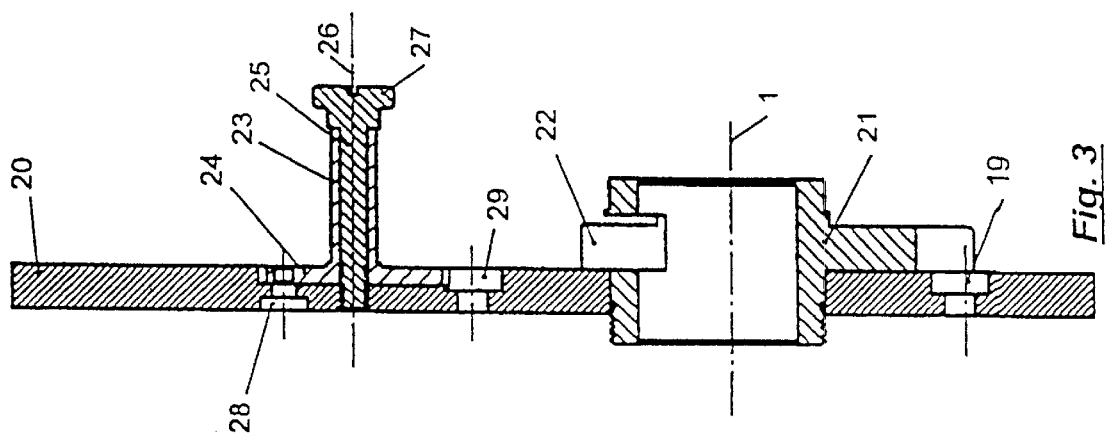
Figure 2:
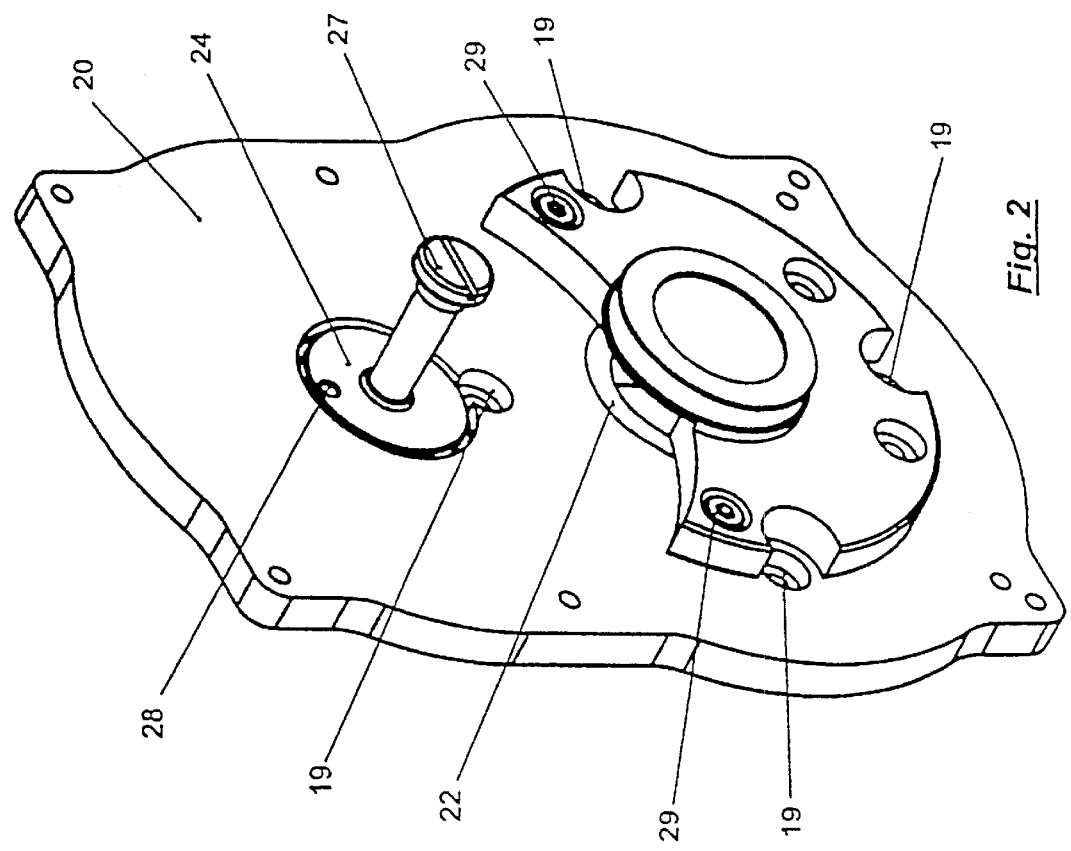

Gearing 30 of the steering boost arrangement should have as little play as possible in order to ensure good steering behavior. It is necessary to ensure simultaneously that the gear efficiency is as high as possible in order to be able to suffice with low motor power at small overall structural form and, in addition, to be able to keep low the costs for the system including the driving electronic. For this purpose it is advantageous to provide a setting configuration for the toothed wheel play in particular in the proximity of the first spur wheel 33 with the second pinion 37. With such a device the plays of the two toothed wheel meshing 32, 38 of the toothed wheel pairs can be set optimally. For this purpose, for example the rotational axis of the first spur wheel 33 with the second pinion 37 is provided with an eccentric rotational axis 23, 24, 25, 26a, 27, which can be set by rotation. This can be carried out, for example, with a fastening and set screw 27, which is rotatably disposed within an eccentric bore 25. The eccentric disc 24 which incorporates the eccentric bore, in turn, is in contact on carrier plate 20 and can there be fixed in the selected position, for example with a clamping bolt 28. By rotating the set screw 27 the radial axis spacing of the steering shaft axis 1 and the rotational axis 26 is varied. These details are more precisely evident in the sectional representation of carrier plate 20 in FIG. 3 and the three-dimensional representation of carrier plate 20 according to FIG. 2. Further evident in these representations are the fastening bores 19, on which the stator 12 of the rotor disc motor 10 is fixed. Furthermore is shown the tubular fitting-shaped bearing holding block 21, which encompasses the steering shaft axis 1 and in this preferred embodiment the bearing holding block 21 is depicted as a separate element which is disposed on the carrier plate 20 with bearing block fastening means 29. The penetration opening 22 for the first spur toothed wheel 33 is developed in the bearing holding block 21 as a slot-shaped penetration opening. If the gear arrangement 30 comprises a sealed housing 20, 41 and the shaft 4 is provided at both sides during the entrance and exit through the housing with shaft sealing rings 43, the gear can contain a fluid such as in particular a lubrication oil. Thereby an advantageous damping is attained and the noise development is strongly decreased. In addition the friction is further reduced and therewith the efficiency additionally increased.

What is claimed is:

1. A steering boost arrangement for motor vehicles with a steering shaft (4) rotatable about a steering shaft axis (1) with an electric rotor disc motor (10) disposed coaxially with the steering shaft axis, and with a spur gearing (30) disposed eccentrically to the steering shaft axis (1), with the motor (10) with its rotor disc (13) being connected to a first toothed wheel pinion (31) of the spur gearing (30) and the first toothed wheel pinion being supported (16,39) coaxially rotatable about the shaft (4), and which is operationally connected via a first spur toothed wheel (33) and further toothed wheels (37,40), in stages, to the shaft (4) such that a number of rotations of the shaft is reduced.

2. The arrangement as claimed in claim 1, wherein the spur gearing (30) is multi-staged.

3. The arrangement as claimed in claim 1, wherein the first toothed wheel pinion (31), the first spur toothed wheel (33), and the further toothed wheels (37,40) are engaged in pairs and are disposed in parallel planes to a rotor plane of the arrangement.

4. The arrangement as claimed in claim 3, wherein at least one of the pairs of engaged toothed wheels (32,33; 37,40) in engagement, is denticulated obliquely.

5. The arrangement as claimed in claim 1, wherein the motor-gear efficiency is at least 75%.

6. The arrangement as claimed in claim 1, wherein the arrangement, at a motor supply of 75 A in 12 V operation, transfers to the shaft (4) a torque of $\geq 50$ Nm.

7. The arrangement as claimed in claim 1, wherein rotationally movable parts of the arrangement including the shaft (4), the rotor (13), and the gear toothed wheels (32, 33, 37, 40) are supported with rolling bearings.

8. The arrangement as claimed in claim 1, including a carrier plate (20) between the motor (10) and the gearing (30), the carrier plate having an opening through which the shaft (4) with the pinion (31) is guided, and means (41, 42) for fastening the arrangement to a motor vehicle chassis connected to the carrier plate.

9. The arrangement as claimed in claim 8, wherein a shaft penetration opening of the carrier plate (20) is developed as a tubular fitting-shaped bearing holding block (21) for receiving bearings (16, 39) for the first toothed wheel pinion (31).

10. The arrangement as claimed in claim 9, wherein the tubular fitting-shaped bearing holding block (21) has a lateral penetration opening (22) for the first spur toothed wheel (33), which engages the first pinion (31).

11. The arrangement as claimed in claim 1, including means for electric commutation of the motor (10), and the rotor disc (13) containing rare-earth permanent magnets (14).

12. The arrangement as claimed in claim 1, including an electric regulator for driving the motor (10).

13. The arrangement as claimed in claim 12, including means for torque measurement provided on a steering wheel side (2) of the shaft (4).

14. The arrangement as claimed in claim 13, wherein the electronic regulator is connected to the means for torque measurement.

15. The arrangement as claimed in claim 1, wherein the spur gearing (30) is encompassed by a sealing housing (20, 41).

* * * * *